United States Patent
Oehman, Jr.

(10) Patent No.: US 7,278,840 B2
(45) Date of Patent: Oct. 9, 2007

(54) COMPLIANT VISCOUS SEAL FOR FLUID TRANSFER DEVICE

(75) Inventor: Robert E. Oehman, Jr., Raleigh, NC (US)

(73) Assignee: Parker-Hannifin Corporation, Cleveland, OH (US)

( * ) Notice: Subject to any disclaimer, the term of this patent is extended or adjusted under 35 U.S.C. 154(b) by 388 days.

(21) Appl. No.: 10/878,756

(22) Filed: Jun. 28, 2004

(65) Prior Publication Data

US 2004/0265141 A1 Dec. 30, 2004

Related U.S. Application Data

(60) Provisional application No. 60/483,570, filed on Jun. 27, 2003.

(51) Int. Cl.
*F03C 2/00* (2006.01)
*F04C 15/00* (2006.01)

(52) U.S. Cl. ............. 418/102; 277/430; 277/431; 277/432; 384/130; 384/138; 384/151; 384/152; 418/104

(58) Field of Classification Search ......... 277/372, 277/373, 430, 431, 432, 563, 579; 384/130, 384/138, 151, 152; 418/171, 166, 206.1, 418/102, 104
See application file for complete search history.

(56) References Cited

U.S. PATENT DOCUMENTS

| | | | |
|---|---|---|---|
| 2,758,857 A | 8/1956 | Smith | |
| 2,964,339 A | 12/1960 | Macks | |
| 3,973,779 A * | 8/1976 | Burgmann et al. | 277/425 |
| 4,010,960 A | 3/1977 | Martin | |
| 4,304,409 A * | 12/1981 | Orlowski | 277/430 |
| 4,466,620 A * | 8/1984 | Orlowski | 277/412 |
| 4,471,963 A | 9/1984 | Airhart | |
| 4,948,152 A * | 8/1990 | Kilthau et al. | 277/430 |
| 5,145,341 A | 9/1992 | Drane | |
| 5,224,838 A | 7/1993 | Baumgarten | |
| 6,179,594 B1 | 1/2001 | Woodcock | |
| 6,264,447 B1 | 7/2001 | Woodcock | |

FOREIGN PATENT DOCUMENTS

| | | |
|---|---|---|
| EP | 1 267 078 | 12/2002 |
| GB | 621 526 | 4/1949 |

* cited by examiner

*Primary Examiner*—Theresa Trieu
(74) *Attorney, Agent, or Firm*—Clements Walker; Jason S. Miller

(57) ABSTRACT

A viscous seal for fluid transfer devices that deviates from the conventional wisdom of avoiding contact between the seal and a rotating drive shaft of the fluid transfer device. Instead of avoiding contact, contact between the seal and drive shaft is used to effect axial alignment of a sealing sleeve with the shaft. As a result, the viscous seal is compliant in that the sealing sleeve can follow the axis of the drive shaft. Accordingly, the sealing sleeve can fit snugly around the drive shaft for more effective prevention of leakage of low or any viscosity fluid along the drive shaft, but without any significant radial load being applied to the sealing sleeve that might cause undue wear or damage due to galling.

14 Claims, 3 Drawing Sheets

COMPLIANT VISCOUS SEAL FOR FLUID TRANSFER DEVICE

This application claims the benefit of U.S. Provisional Application No. 60/483,570 filed on Jun. 27, 2003, which is hereby incorporated herein by reference in its entirety.

The present invention relates generally to fluid transfer devices and more particularly to a seal for preventing fluid leakage along a drive shaft of the device.

BACKGROUND OF THE INVENTION

Shaft seals are known devices to prevent fluid leakage along a drive shaft of a pump, motor or other fluid transfer device. One known type of shaft seal is a viscous seal. The viscous seal acts like a screw pump, forcing any leaking fluid back into the housing of the fluid transfer device. In a conventional design, the viscous seal is attached to the housing and the drive shaft rotates within a bore in the housing that is sealed by the viscous seal. The viscous seal, if working properly, will not be lubricated by the leaking fluid over its entire length since the leakage will be stopped before reaching the outboard end of the seal. Thus, the drive shaft and the viscous seal will be dry and free from lubrication over a portion thereof. For this reason, prior art viscous seals are designed not to contact the drive shaft to prevent damage to the seal or galling of the drive shaft. The effectiveness of the seal is directly proportional to the radial gap between the seal and the drive shaft. The seal can be made more effective by reducing the gap.

Prior art viscous seals have been effective for preventing leakage of relatively viscous fluids having a viscosity of about 10,000 centipoise or higher. The effectiveness of viscous seals, however, decreases as the viscosity of the leakage fluid decreases. At relatively low viscosities on the order of about 100 centipoise, other means are needed to increase the effectiveness of the viscous seal. As above noted, viscous seal performance can be improved by decreasing the clearance between the drive shaft and the seal, but there are practical limits to maintaining the alignment between the drive shaft and seal in order to prevent contact between the drive shaft and seal. Another technique is to increase the viscosity of the leakage fluid at the seal by cooling the fluid, either actively or passively. The known cooling techniques, however, may not always be suitable for a given application or can introduce undesired additional cost and/or maintenance.

SUMMARY OF THE PRESENT INVENTION

The present invention provides a viscous seal for fluid transfer devices that deviates from the conventional wisdom of avoiding contact between the seal and a rotating drive shaft of the fluid transfer device. Instead of avoiding contact, contact between the seal and drive shaft is used to effect axial alignment of a sealing sleeve with the shaft. As a result, the viscous seal is compliant in that the sealing sleeve can follow the axis of the drive shaft. Accordingly, the sealing sleeve can fit snugly around the drive shaft for more effective prevention of leakage of low or any viscosity fluid along the drive shaft, but without any significant radial load being applied to the sealing sleeve that might cause undue wear or damage due to galling. Moreover, the viscous seal can be manufactured easily and inexpensively.

According to the present invention, a compliant viscous seal for a drive shaft comprises an outer body having a shaft hole for passage therethrough of drive shaft to be sealed by the viscous seal, and a sealing sleeve extending axially in the hole and having an inner surface closely surrounding the shaft to effect light contact therewith such that the sealing sleeve can track any angular shifting or radial translating movement of the drive shaft. The inner surface has formed therein a helical groove for preventing leakage of fluid along the shaft when the shaft is rotated within the sealing sleeve. An annular gap is provided between coextensive axial portions of the outer body and sealing sleeve to permit limited pivotal movement of the sealing sleeve relative to the outer body for allowing the sealing sleeve to coaxially align with the shaft when in use, and an annular seal is provided both to seal the annular gap thereby to prevent leakage around the outside of the sealing sleeve and to support the sealing sleeve within the outer body while allowing the sealing sleeve to pivot with a gimbal action within the outer body.

The annular seal preferably is flexible and most preferably is resilient. The annular seal can be radially interposed between the sealing sleeve and outer body. In particular, the annular seal, such as an O-ring, can be retained in an annular groove formed in one of the outer body and sealing sleeve, and most preferably in the sealing sleeve. The portion of the annular gap in the region of the resilient annular seal can have a radial dimension less than the radial dimension more remote from the resilient annular seal for more effective sealing of the gap.

Further in accordance with the invention, an anti-rotation device is provided to inhibit rotation of the annular seal relative to the outer body while allowing the sealing sleeve to pivot with a gimbal action within the outer body. The anti-rotation device preferably includes one or more keys and slots. For example, aligned slots can be formed in the inner surface of the hole and an outer surface of the sealing sleeve, and a key can be disposed in the radially aligned slots to prevent rotation of the sealing sleeve relative to the outer body, while still permitting the aforesaid pivoting movement.

The outer body of the viscous seal can be formed by an outer annular sleeve that can be attached to the housing of the fluid transfer device. In another configuration, the outer body can be unitary with the housing of the fluid transfer device.

The compliant viscous seal of the invention generally can be used in any fluid transfer device and has particular application in a gear pump.

Further features of the present invention will become apparent to those skilled in the art upon reviewing the following specification and attached drawings.

DETAILED DESCRIPTION OF THE PREFERRED EMBODIMENT

Figure 1:
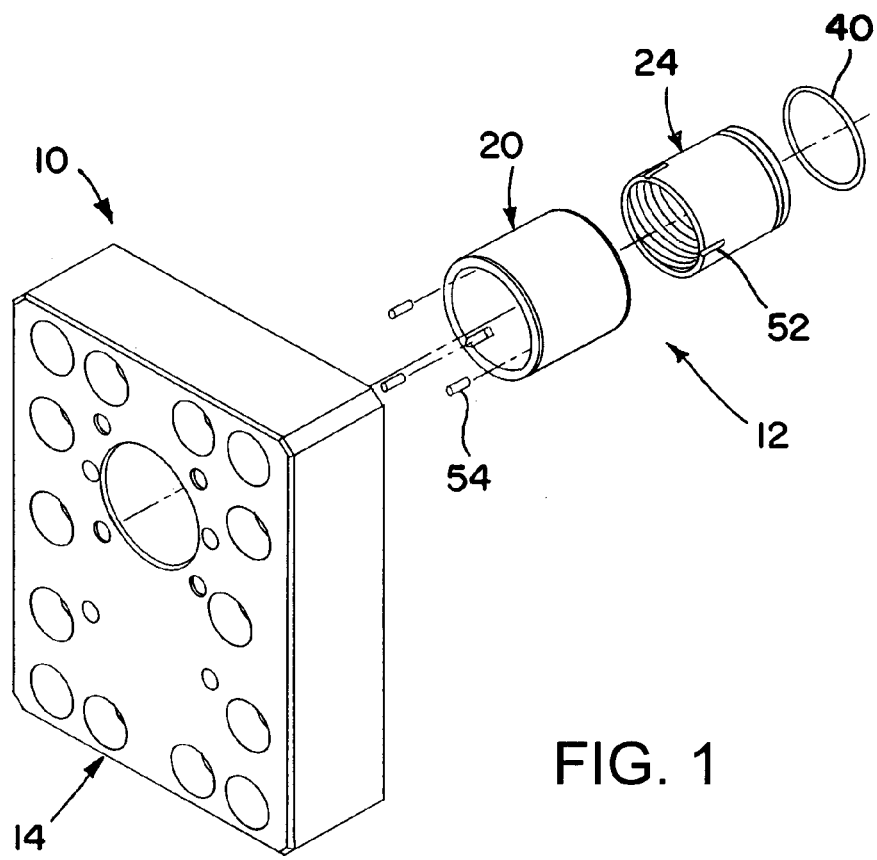
FIG. 1 is an exploded view of a fluid transfer device showing a compliant viscous seal according to the present invention in relation to a cover plate forming part of the fluid containment housing of the fluid transfer device.
Figure 2:
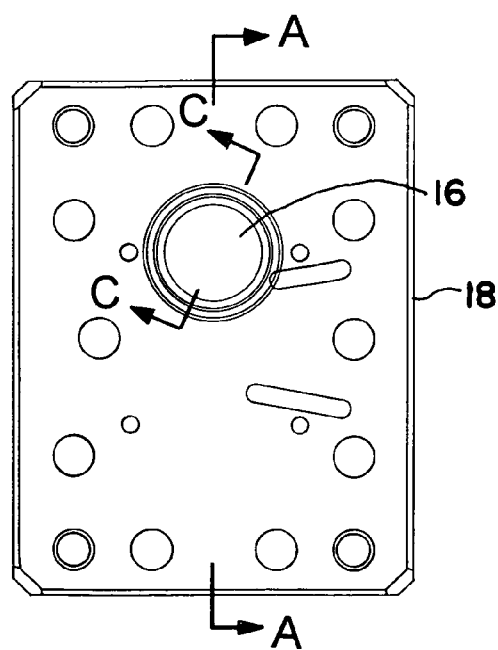
FIG. 2 is an inner view of the cover plate and compliant viscous seal of FIG. 1, with a drive shaft extending through the compliant viscous seal.

Referring now in detail to the drawings and initially to FIGS. 1 and 2, a fluid transfer device is indicated generally at 10. The fluid transfer device 10 may be of any design aside from the provision of a compliant viscous seal according the present invention, an exemplary embodiment of which is indicated generally at 12. Consequently, there is shown only the part of the housing 14 of the fluid transfer device through which a drive shaft 16 extends. As illustrated, such housing part is a cover plate 18. As will be appreciated by those skilled in the art, the fluid transfer device will include other components for carrying out its particular function, be it a fluid pump, fluid motor, etc. In addition, the housing will contain a fluid whose leakage along the drive shaft is stopped by the compliant viscous seal 12. Although not shown, one or more packing or lip seals can be provided outwardly of the compliant viscous seal, as deemed necessary, to provide a static, fluid tight seal between the drive shaft and the outer body.

The compliant viscous seal 12 for the drive shaft 16 comprises an outer body 20 having a shaft hole 22 for passage therethrough of the drive shaft 16, and a sealing sleeve 24 extending axially in the hole 22. In the illustrated embodiment, the outer body 20 is formed by an outer sleeve that if fixed, as by press-fitting, in a through bore in the cover plate 18 of the housing 14. The outer body can be otherwise configured and secured to the housing, or the outer body can be unitary (formed as one piece) with the cover plate or other part of the housing, as may be desired for different applications.

The sealing sleeve 24 has an inner surface 30 closely surrounding the drive shaft 16, preferably with a snug fit such that there is essentially no or a minute clearance between the inner surface 30 and corresponding outer surface of the drive shaft. The inner surface 30 has formed therein one or more helical grooves 32 for preventing leakage of fluid along the drive shaft 16 when the drive shaft is rotated within the sealing sleeve. Rotation of the drive shaft within the sealing sleeve provides a motive force to any leakage fluid, causing the fluid to be reversely pumped back toward the interior of the housing 14 by virtue of the oppositely turned helical groove or grooves 32, as is well known in the art. That is, the helical groove or grooves have an opposite or reverse "hand" or flight direction as the rotation of drive shaft, such that when drive shaft rotates, the groove or grooves "pump" any fluid leaking down along drive shaft back toward the interior of the housing. The herein reference to a helical groove, unless otherwise indicated, is intended to encompass any known and future equivalents that perform substantially the same function as the helical groove.

Figure 3:
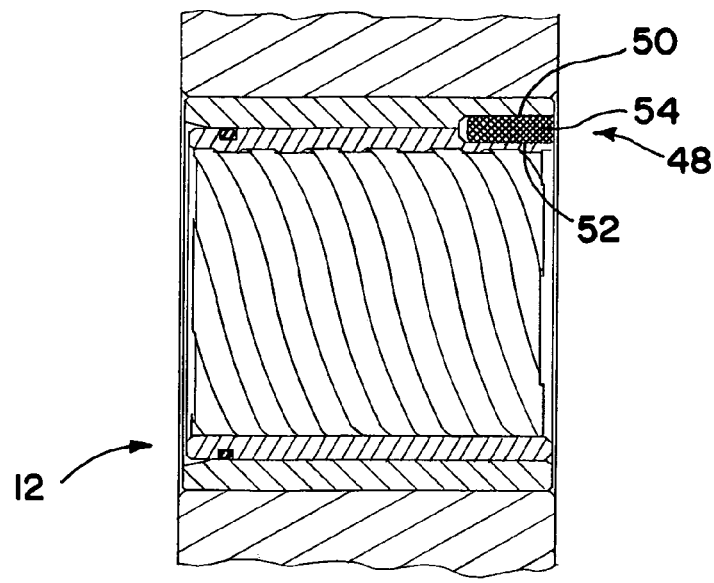
FIG. 3 is an enlarged fragmentary cross-sectional view taken along the line 3-3 of FIG. 2, with the drive shaft removed.
Figure 4:
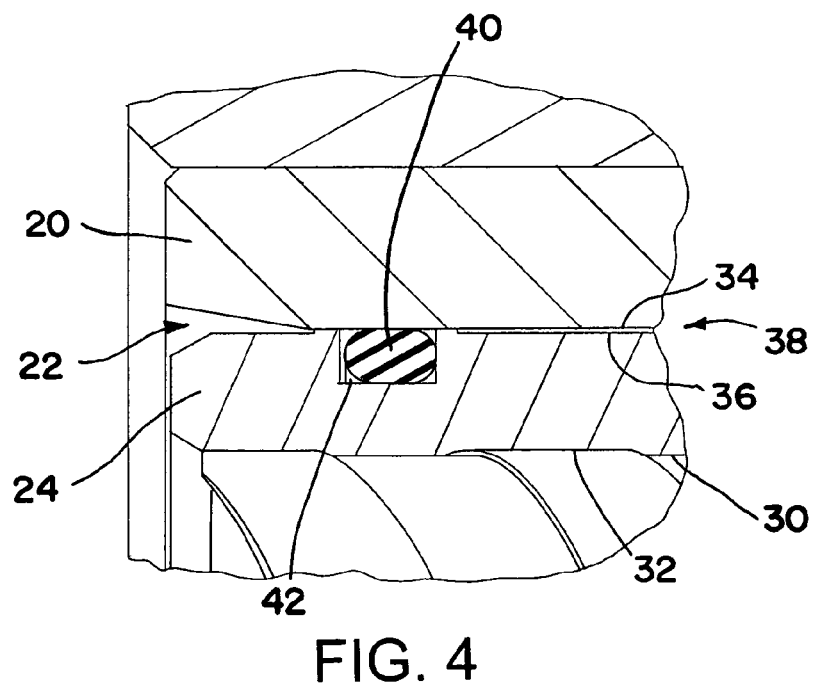
FIG. 4 is an enlarged inner axial portion of FIG. 3.

While the inner generally cylindrical surface 30 of the sealing sleeve 24 can be of a conventional configuration, the outer surface 34 of the sealing sleeve is uniquely configured in relation to the inner surface of the outer body 20. As best seen in FIGS. 3 and 4, the outer, preferably cylindrical, surface 34 of the sealing sleeve is smaller in dimension (diameter) than the inner, preferably cylindrical, surface 36 of the outer body, thereby to provide an annular radial gap 38 between coextensive axial portions of the outer body and sealing sleeve. This gap permits limited pivotal and/or radial translational movement of the sealing sleeve relative to the outer body for allowing the sealing sleeve to coaxially align with the shaft 16 when in use. If, for example, the drive shaft is out of axial alignment with the hole 22 in the outer body, the sealing sleeve can pivot and/or radially shift relative to the outer body to align axially with the drive shaft and/or maintain its axial alignment with the drive shaft, as described in more detail below.

As seen in FIGS. 3 and 4, a resilient annular seal 40 is interposed between the sealing sleeve 24 and outer body 20 to seal the annular gap 38 thereby to prevent leakage around the outside of the sealing sleeve. The resilient annular seal also performs a second function, this being to support the sealing sleeve within the outer body while allowing the sealing sleeve to pivot with a gimbal action within the outer body and/or to shift radially (translate) relative to the outer body. This gimbal and/or shifting action allows the sealing sleeve to align axially with the drive shaft with little force being exerted on the sealing sleeve. As a result, the sealing sleeve will carry only a nominal radial load that will not cause undue wear or galling. Of course, suitable materials should be selected to withstand this nominal radial load. Such materials can be conventional tool steels for the outer body and sealing sleeve, and conventional resilient materials for the annular seal. By way of further example, the outer body and/or sealing sleeve can be formed of a material (e.g., steel or bronze) appropriate for the particular application. Alternatively, such components could be formed of a non-metal, such as a carbon, silicon carbide, ceramic or plastic. In applications where operating temperatures vary over a wide range, it is best that the sealing sleeve and shaft, in particular, be made of materials having similar coefficients of thermal expansion.

The resilient annular seal 40, such as an elastomeric O-ring, preferably is retained in an annular groove 42 formed in one of the outer body 20 and sealing sleeve 24, and most preferably in the sealing sleeve as shown. The portion of the annular gap 38 in the region of the resilient annular seal can have a radial dimension less than the radial dimension more remote from the resilient annular seal for more effective sealing of the gap. That is, a conventional O-ring clearance gap, such as about 0.002-0.004 inch on the radius, can be provided in the region surrounding the O-ring and the groove therefor, while a larger radial gap, such as about 0.0125 to 0.015 inch on the radius, can be provided elsewhere to accommodate the desired range of movement of the sealing sleeve relative to the outer body. The O-ring 40 functions as a gimbal support for the sealing sleeve and its resilience also permits radial shifting of the sealing sleeve within the hole in the outer body. Preferably, the sealing sleeve is axially constrained in the outer body by any suitable means, for example to prevent internal fluid pressure from axially forcing the sealing sleeve out of the hole in the outer body. Such constraint could be provided by other parts which radially overlap one or both axial ends of the hole in the outer body.

As will be appreciated by those skilled in the art, other annular seal devices can be used to seal and support the sealing sleeve 24. Such devices can be internal to the housing 14 of the source of fluid leakage as shown, or it can be attached externally to the housing. For example, a radially extending flange can be provided on the sealing sleeve, and an O-ring or gasket can be applied to the flange, on one or both sides. The flange itself can be polished in order to provide a seal, and the flange or the sealing sleeve itself can be made thin enough in construction to provide a flexible seal that allows angular misalignment to be accommodated, merely by flexing the material of the flange or sleeve. The invention is intended to encompass these and other equivalent mounting configurations.

Further in accordance with the invention, an anti-rotation device 48 is provided to inhibit rotation of the sealing sleeve 24 relative to the outer body 20 while allowing the sealing sleeve to pivot with a gimbal action and/or radially translate within the outer body. The anti-rotation device preferably includes one or more keys and slots. For example, aligned slots 50 and 52 can be formed respectively in the inner surface of the hole 22 and an outer surface 34 of the sealing sleeve, and a key 54 can be disposed in the radially aligned slots to prevent rotation of the sealing sleeve relative to the outer body, while still permitting the aforesaid pivoting and/or translating movement. The keys, which can be in the form of pins, can be circumferentially equally spaced around the axis of the sealing sleeve. A suitable retention means can be provided for axially retaining the pins in the slots.

Figure 5:
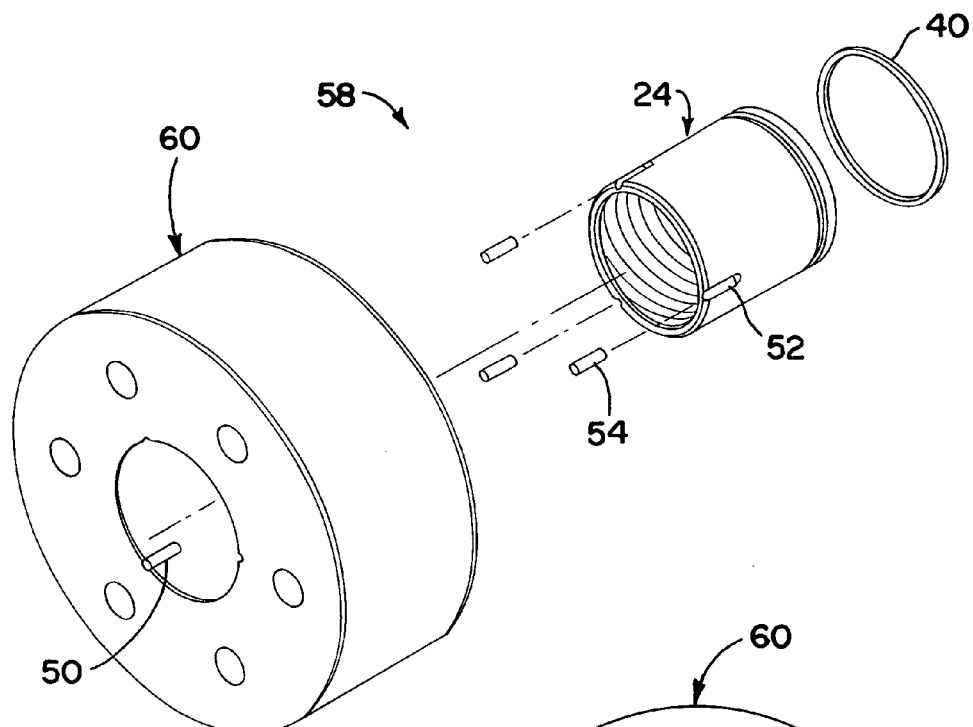
FIG. 5 is an exploded view of another embodiment of a compliant viscous seal according to the present invention, configured for mounting to a housing of a fluid transfer device.
Figure 6:
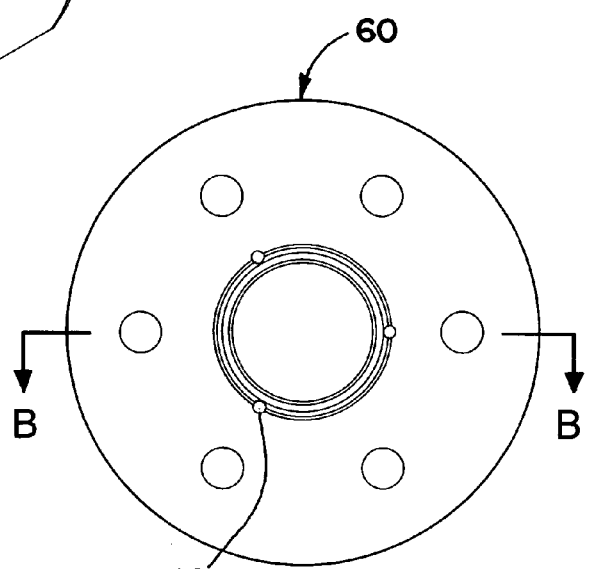
FIG. 6 is an outer view the compliant viscous seal of FIG. 5.
Figure 7:
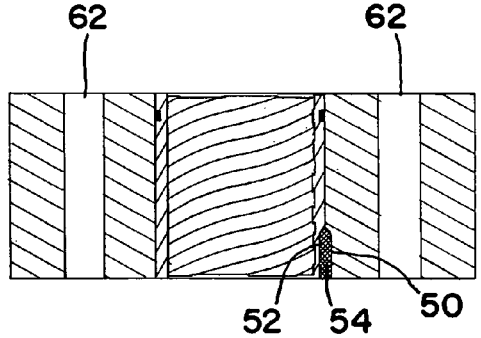
FIG. 7 is a cross-sectional view taken substantially along the lines 8-8 of FIG. 6.

Referring now to FIGS. 5-7, another embodiment of a compliant viscous seal according the invention is disclosed, such be indicated generally at 58. The seal is in substantial part identical to the seal of FIGS. 1-4, and thus like reference numerals are used to denote like parts. The only difference is that the outer body 60 is formed by a circular housing configured for external mounting to a housing of a fluid transfer device 10. To this end the circular seal housing has a plurality of bores 62 for accommodating bolts used to attach the seal housing to the housing of the fluid transfer device 10 and thus close an opening in the housing through which the drive shaft 16 of the device extends.

The compliant viscous seal 12 of the invention generally can be used in any fluid transfer device 10 and has particular application in a gear pump. By way of further example, the fluid transfer device could be a pump for melted synthetic fiber, an extrusion pump, a petroleum distillate pump, a hot melt adhesive pump, etc. The device also can be operated as a pump or motor, depending on whether the shaft is being used to move fluid, or the fluid is being used to move the shaft.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A compliant viscous seal for a rotatable shaft, comprising:
    an outer body having a shaft hole for passage therethrough of a rotatable shaft to be sealed by the viscous seal; and
    a sealing sleeve extending axially in the hole and having an inner surface surrounding the shaft, the inner surface having formed therein a helical groove for preventing leakage of fluid along the shaft when the shaft is rotated within the sealing sleeve;
        wherein an annular gap is provided between coextensive axial portions of
    the outer body and sealing sleeve to permit limited pivotal movement of the sealing sleeve relative to the outer body for allowing the sealing sleeve to coaxially align with the shaft when in use, and
    wherein a flexible resilient annular seal, radially interposed between the sealing sleeve and outer body and retained in an annular groove formed in the sealing sleeve, is provided (i) to seal the annular gap thereby to prevent leakage around the outside of the sealing sleeve, and (ii) to support the sealing sleeve within the outer body while allowing the sealing sleeve to pivot with a gimbal action within the outer body.

2. A viscous seal as set forth in claim 1, wherein the portion of the annular gap in the region of the annular seal has a radial dimension less than the radial dimension more axially remote from the resilient annular seal.

3. A viscous seal as set forth in claim 1, wherein the annular seal additionally permits radial translation of the sealing sleeve relative to the outer body.

4. A viscous seal as set forth in claim 1, wherein the resilient annular seal is an O-ring.

5. A fluid transfer device comprising a housing, a shaft extending through the housing, and the viscous seal of claim 1 sealing against leakage along the shaft.

6. A fluid transfer device as set forth in claim 5, wherein the outer body of the viscous seal is formed by a bore through the housing.

7. A fluid transfer device as set forth in claim 5, wherein the outer body of the viscous seal is secured to the housing or unitary with a cover plate or other part of the housing.

8. A fluid transfer device as set forth in claim 7, wherein the outer body is an outer sleeve fixed in the bore in the housing.

9. A compliant viscous seal for a rotatable shaft, comprising:
    an outer body having a shaft hole for passage therethrough of a rotatable shaft to be sealed by the viscous seal; and
    a sealing sleeve extending axially in the hole and having an inner surface surrounding the shaft, the inner surface having formed therein a helical groove for preventing leakage of fluid along the shaft when the shaft is rotated within the sealing sleeve;
    an anti-rotation device with a key and slot is provided to inhibit rotation of the annular seal relative to the outer body while allowing the sealing sleeve to pivot with a gimbal action within the outer body;
        wherein an annular gap is provided between coextensive axial portions of
    the outer body and sealing sleeve to permit limited pivotal movement of the sealing sleeve relative to the outer body for allowing the sealing sleeve to coaxially align with the shaft when in use, and
    wherein an annular seal is provided (i) to seal the annular gap thereby to prevent leakage around the outside of the sealing sleeve, and (ii) to support the sealing sleeve within the outer body while allowing the sealing sleeve to pivot with a gimbal action within the outer body.

10. A viscous seal as set forth in claim 9, wherein the anti-rotation device the key and slot are a plurality of keys and slots circumferentially arranged around an axis of the sealing sleeve.

11. A compliant viscous seal for a rotatable shaft, comprising:
    an outer body having a shaft hole for passage therethrough of a rotatable shaft to be sealed by the viscous seal;
    a sealing sleeve extending axially in the hole and having an inner surface surrounding the shaft, the inner surface having formed therein a helical groove for preventing leakage of fluid along the shaft when the shaft is rotated within the sealing sleeve; and an anti-rotation device with radially aligned slots formed in the inner surface of the hole and an outer surface of the sealing sleeve, and a key disposed in the radially aligned slots is provided to inhibit rotation of the annular seal relative to the outer body while allowing the sealing sleeve to pivot with a gimbal action within the outer body;

wherein an annular gap is provided between coextensive axial portions of the outer body and sealing sleeve to permit limited pivotal movement of the sealing sleeve relative to the outer body for allowing the sealing sleeve to coaxially align with the shaft when in use, and wherein an annular seal is provided (i) to seal the annular gap thereby to prevent leakage around the outside of the sealing sleeve, and (ii) to support the sealing sleeve within the outer body while allowing the sealing sleeve to pivot with a gimbal action within the outer body.

12. A compliant viscous seal for a rotatable shaft, comprising:

an outer body having a shaft hole for passage therethrough of a rotatable shaft to be sealed by the viscous seal; and a sealing sleeve extending axially in the hole and having an inner surface surrounding the shaft, the inner surface having formed therein a helical groove for preventing leakage of fluid along the shaft when the shaft is rotated within the sealing sleeve;

wherein an annular gap is provided between coextensive axial portions of the outer body and sealing sleeve to permit limited pivotal movement of the sealing sleeve relative to the outer body for allowing the sealing sleeve to coaxially align with the shaft when in use, wherein an annular seal is provided (i) to seal the annular gap thereby to prevent leakage around the outside of the sealing sleeve, and (ii) to support the sealing sleeve within the outer body while allowing the sealing sleeve to pivot with a gimbal action within the outer body, and wherein the sealing sleeve has an inner fluid contacting axial end and an opposite outer axial end, and the annular seal is located closer to the inner axial end than the outer axial end.

13. A viscous seal as set forth in claim 1, wherein the outer body is formed by an outer sleeve.

14. A fluid transfer device comprising a fluid containment housing, a shaft extending through a wall of the fluid containment housing, and a compliant viscous seal for the shaft, said seal comprising:

an outer body having a shaft hole for passage therethrough of the rotatable shaft to be sealed by the viscous seal; and a sealing sleeve extending axially in the hole and having an inner surface surrounding the shaft, the inner surface having formed therein a helical groove for preventing leakage of fluid along the shaft when the shaft is rotated within the sealing sleeve;

wherein an annular gap is provided between coextensive axial portions of the outer body and sealing sleeve to permit limited pivotal movement of the sealing sleeve relative to the outer body for allowing the sealing sleeve to coaxially align with the shaft when in use, and wherein a flexible resilient annular seal, radially interposed between the sealing sleeve and outer body and retained in an annular groove formed in the sealing sleeve, is provided (i) to seal the annular gap thereby to prevent leakage around the outside of the sealing sleeve, and (ii) to support the sealing sleeve within the outer body while allowing the sealing sleeve to pivot with a gimbal action within the outer body.

* * * * *